UNITED STATES PATENT OFFICE.

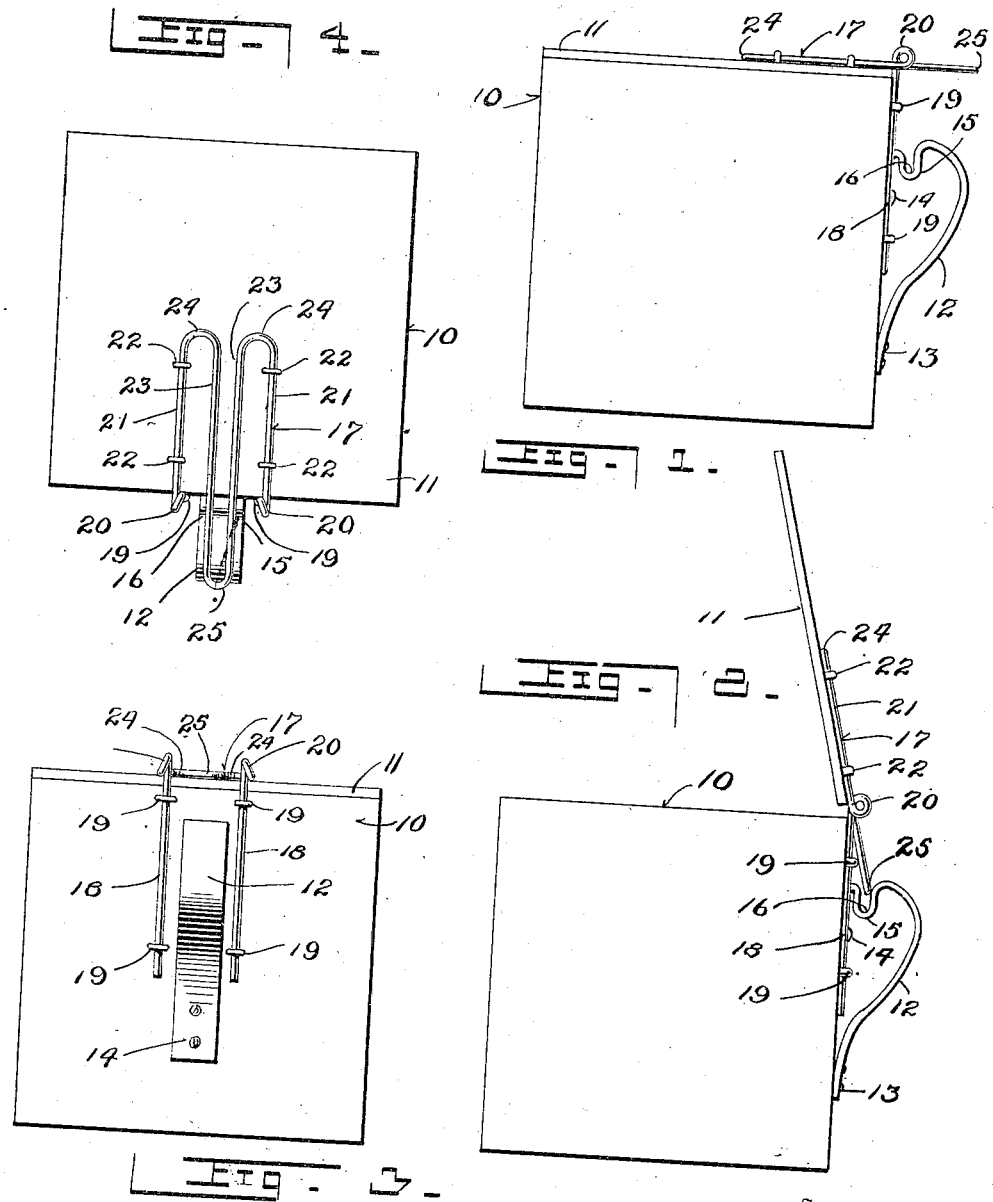

MATTIE GRISHAM, OF ATHENS, TEXAS.

SPITTOON.

1,041,621.

Specification of Letters Patent.    Patented Oct. 15, 1912.

Application filed April 17, 1912. Serial No. 691,326.

*To all whom it may concern:*

Be it known that I, MATTIE GRISHAM, a citizen of the United States, residing at Athens, in the county of Henderson and State of Texas, have invented certain new and useful Improvements in Spittoons, of which the following is a specification.

This invention relates to improvements in spittoons, or sputum cups, particularly adapted for hospital use.

The principal object of the invention is to provide a device of this character with means whereby the patient may hold the cup and raise the lid with one hand.

Another object is to provide a device of this character having a handle so constructed that the opening means may be engaged therewith to hold the lid open.

Another object is to provide spring hinges for the lid and an extension for engagement by the thumb to raise the lid, made of a single piece of wire.

Other objects and advantages will be apparent from the following description and with particular reference to the accompanying drawings.

In the drawings: Figure 1 is a side elevation of a sputum cup made in accordance with my invention, the lid being closed, Fig. 2 is a similar view showing the lid raised, Fig. 3 is a rear elevation of the cup and Fig. 4 is a top plan view.

Referring particularly to the drawings, 10 represents a cup formed of any suitable material, but preferably of water-proofed paper as this can be more readily destroyed. The cup is provided with a lid 11. On one side of the cup is secured a handle 12 formed preferably of a thin strip of sheet metal, attached at the points 13 and 14. The attached portion 14 is provided with a bend 15 which forms a depression 16 the purpose of which will be later set forth.

A combined opener and spring hinge 17 is disposed between the lid and the side of the cup which carries the handle. This opener and hinge comprises the vertical arms 18 arranged parallel to each other and secured to said side of the cup by suitable fastenings as the wire staples 19. The upper end of each of these arms 18 is given a single turn 20, and continues over the top of the cup where it forms the arm 21 secured to said top by the wire staples 22. Arranged between the arms 21 and extending in the direction of the handle 12 are a pair of arms 23 each of which has one end connected to an arm 21 as at 24, their opposite ends being connected as at 25. The portions of the arms 23 which are connected together extend beyond the rear edge of the lid and form a thumb-piece by means of which the lid may be raised. It will thus be seen that pressure on the connection 25 will raise the lid against the tension of the spring turns 20, so that upon release of said portion 25 the lid will be automatically closed.

When it is desired to hold the lid open for any period, the connection 25 is adapted to be engaged in the depression 16 of the handle. To close the lid, very little pressure is necessary to release the portion 25 from engagement with the handle.

These cups are intended to be destroyed by fire, after being used thus forming a perfectly sanitary device of this character. It will also be observed that a patient may use the cup and open the lid with one hand.

What is claimed is:

1. A sputum cup comprising a receptacle, a lid therefor, a handle on one side of the cup, a spring hinge for the lid, said hinge comprising arms secured to the side of the receptacle on either side of the handle, arms secured to the lid of the receptacle, single turns between the side and top arms formed integrally therewith, and a rearward extension on the top arms projecting over the handle and adapted for engagement with said handle to hold the lid open.

2. A sputum cup comprising a receptacle, a lid therefor, a handle on one side of the cup, said handle being formed with a depression adjacent the side of the receptacle a spring hinge connecting the lid to the receptacle and formed of a single piece of wire, and a rearward extension formed integrally with the hinge for engagement in said depression to hold the lid open.

In testimony whereof I affix my signature, in the presence of two witnesses.

MATTIE GRISHAM.

Witnesses:
PINKIE GRISHAM,
CLARL A. BELLAMY.